Jan. 7, 1964   H. SCHANKLER   3,116,671
CAMERA FLASHER SYSTEMS
Filed Oct. 23, 1959

INVENTOR.
HAROLD SCHANKLER
BY
J. B. Felshin
ATTORNEY.

United States Patent Office 3,116,671
Patented Jan. 7, 1964

3,116,671
CAMERA FLASHER SYSTEMS
Harold Schankler, Brooklyn, N.Y., assignor to
Diane Faith Schankler, Brooklyn, N.Y.
Filed Oct. 23, 1959, Ser. No. 848,411
4 Claims. (Cl. 95—11.5)

This invention relates to camera flasher systems. It is particularly directed to a speed light flasher system which may be built into a camera, to be repeatedly used, and employing flash tubes, envelopes, or bulbs, filled with xenon, argon, neon, or the like gas.

In a conventional flasher, the capacitor is charged to some high direct current value. By triggering such a flash tube with a pulse, the energy stored in the capacitor is released to flash the tube.

With A.C., this cannot be done because one never knows where the A.C. voltage will be at a particular time, since the voltage continuously varies, for example, at the rate of 60 cycles per second. It is hence one object of the present invention to provide a highly improved camera flasher system of the character described utilizing A.C. house current, with means for triggering the tube a plurality of times in rapid succession to ensure triggering at the minimum firing voltage of the flash tube. The tube in my improved system is normally non-conductive at the maximum A.C. voltage. However, when triggered with a high voltage pulse or pulses, the gas in the tube ionizes, and if the triggered voltage impressed on the primary electrodes of the tube is sufficient, large current flows through the tube to flash the tube, until the voltage across the primary electrodes drops to a certain minimum value, at which time the tube will cease to conduct until triggered again.

The tube, when it conducts, acts as a low impedance. If this were operated off a D.C. source, which can supply high current, without excessive voltage drop, then the tube would continue to conduct indefinitely until it is destroyed. By using A.C., which is constantly changing voltage, as soon as the voltage decreases sufficiently, the conduction stops until triggered again.

In one form of the invention, the successive triggerings are obtained by sequential closing of a plurality of capacitor circuits connected in parallel with each other and in series with a transformer, the secondary coil of which is in circuit with the primary electrodes of the tube.

In another form of the invention, the multiple pulses for the triggerings, are provided by a transistor oscillating circuit.

Another object of this invention is to provide in a system of the character described, an economical and positive means for ensuring flashing of the tube, which shall be highly efficient in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawings in which is shown an illustrative embodiment of this invention, FIG. 1 is a wiring diagram illustrating one system embodying my invention; and FIG. 2 is a wiring diagram illustrating a system embodying another form of the invention.

Referring now in detail to the drawing, and particularly to FIG. 1 thereof, 10 designates a camera flasher system embodying the invention. In said diagram, 12 and 13 designate leads of an A.C. supply, such as a house current. The lead 11 is connected by wire 13, through inductance 14 to one primary or main electrode 15 of a gas filled tube 16, such as an xenon, neon or argon filled flasher tube. The other primary or main electrode 15a, of said tube is connected by wire 18 to the other lead 12 of said source of A.C. current. The purpose of the inductance 14 is to limit the maximum current through the flash tube.

Lead 11 is also connected by wire 20 to a rectifier 21, which is connected to a wire 22. Across the wires 22, 18 are a plurality of series connected resistances 23 and capacitors 24, in parallel with each other. The junctions between the resistances and capacitors are connected by wires 25 to spaced contacts 26 adapted to be contacted sequentially by a shutter leaf 30 of the camera in which this system is incorporated. Said leaf 30 may have a finger 31 which will sweep across the spaced contacts 26 when an exposure is made. The leaf is connected by wire 32 to one side of the primary coil 33 of a transformer 34. The other side of said coil is connected by wire 35 to said wire 18.

One side of the secondary coil 36 of said transformer 34 is connected by wire 37 to the starter electrode 17 of tube 16. The other side of coil 36 is connected by wire 38 to said wire 18.

The tube 16 is subject to A.C. voltage from the house current but will not flash until it is subjected to high voltage D.C. pulse from the triggered transformer.

If there were only one capacitor 24 and one contact 26, the circuit through the capacitor might be made at a time when the A.C. voltage, which varies continuously, is at a value below the minimum required to effect a flash.

By making several sequential contacts, if one is made at a time when the A.C. voltage is too low, another will be made in such timed relation that at least one of the contacts 26 is engaged by finger 31 at a time when the A.C. voltage is high enough or sufficient to cause a flash.

In FIG. 2 there is shown a wiring diagram 10a embodying a modified form of the invention. In said diagram, 50 designates a transistor. Wire 51 connects the base of the transistor to a resistance 52 which is connected by wire 53 to one side of the primary coil 55 of a transformer 56. The other side of said coil 55 is connected by wire 57 to the collector of the transistor 50. An intermediate portion of coil 55 is connected by wire 58 to a shutter leaf 59 of the camera in which the system is incorporated. Leaf 59 has a finger 60 adapted to engage a contact 61 when an exposure is made. Contact 61 is connected by wire 62 to one side of a capacitor 63. The other side of the capacitor is connected by wire 64 to the emitter of the transistor 50.

Across the capacitor 63 is low voltage D.C. battery 65 in series with a high value resistance 67. The battery may be 6 volts and the resistance 67 may be about 1,000 ohms.

The secondary coil 70 of transformer 56 is connected by wire 71 to the lead 72 of an A.C. supply such as house current. The other side of said coil 70 is connected by wire 73 to the starter electrode 74 of a gas filled flasher tube 75, such as an xenon, argon, neon or the like gas filled tube. One primary electrode 76a of the tube is connected by wire 76 to the lead 77 of the A.C. source. Lead 72 is connected by wire 78 to the other primary electrode 78a of tube 75.

The transistor oscillating circuit provides multiple pulses, and as soon as one of these pulses takes place at a time when the A.C. voltage in tube 75 is above the minimum required to flash the tube, it will flash. The transistor oscillating circuit, it will be noted, will oscillate only while the capacitor 63 is charged above a predetermined valve and finger 60 is contacting contact 61.

When capacitor 63 has discharged to an extent which brings its charge below said predetermined valve, oscillation ceases until the battery 65 builds up its charge again, while finger 60 is moved away from contact 61. This arrangement limits the number of pulses to the flasher tube each time the capacitor 63 is fully charged, so that the tube will not run down too fast.

Only one contact is necessary on the shutter switch 60, 61, since the oscillations of the transistor circuit provides the repeated pulses.

An inductance similar to inductance 14 of FIG. 1, may be included in the A.C. circuit.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. In combination, a gaseous discharge tube comprising a transparent envelope having an ionizable gas sealed therein, a pair of main electrodes and an igniter electrode, means to impress at the main electrodes, A.C. voltage the greatest amplitude of which is insufficient to cause the gas in the envelop to conduct, and means to impress an oscillating voltage from the igniter electrode to one of said main electrodes, of such magnitude that when impressed concurrently with a said A.C. voltage of greater amplitude, together, said impressed voltages will be sufficient to cause said gas to conduct, and when impressed concurrently with said A.C. voltage at reduced amplitude, said gas will not conduct, said means for impressing said oscillating voltage including means to insure impressing said oscillating circuit while said greater amplitude of said A.C. current is being impressed, to insure conduction of the gas and flashing of the tube, manual means to control the means for impressing said oscillating circuit, said manual means comprising a camera shutter, said means for impressing oscillating circuit including means to repeatedly impress said circuit a plurality of times, during one movement of said shutter.

2. In combination, a gaseous discharge tube comprising a transparent envelope having an ioniable gas sealed therein, a pair of main electrodes and an igniter electrode, means to impress at the main electrodes, A.C. voltage the greatest amplitude of which is insufficient to cause the gas in the envelop to conduct, and means to impress an oscillating voltage from the igniter electrode to one of said main electrodes, of such magnitude that when impressed concurrently with a said A.C. voltage at greater amplitude, together, said impressed voltages will be sufficient to cause said gas to conduct, and when impressed concurrently with said A.C. voltage at reduced amplitude, said gas will not conduct, said means for impressing said oscillating voltage including means to insure impressing said oscillating circuit while said greater amplitude of said A.C. current is being impressed, to insure conduction of the gas and flashing of the tube, said means to impress an oscillating circuit including a transistor oscillating circuit, means to supply D.C. voltage to said oscillating circuit, manual means to close and open said oscillating circuit, said means to supply D.C. voltage including means to self terminate the supply of D.C. voltage while the manual means is closed.

3. In combination, a gaseous discharge tube comprising a transparent envelope having an ionizable gas sealed therein, a pair of spaced main electrodes and an igniter electrode spaced from both main electrodes, means to continuously impress A.C. voltage on the main electrodes of said tube, a plurality of capacitors connected in parallel, means to supply D.C. voltage to said capacitors, a transformer having a primary coil, manually controlled means to cause said capacitors to sequentially discharge to said primary coil, and said transformer comprising a secondary coil connected across the igniter electrode and one of said main electrodes of said tube, said manually controlled means including a camera shutter element, and means on said element to sequentially connect said capacitors seriatum in circuit with said primary coil as said element is actuated once for exposure.

4. In combination, a transistor oscillating circuit, means to supply D.C. voltage to said oscillating circuit, manual means to close and open said oscillating circuit, a gaseous discharge tube comprising a transparent envelope having an ionizable gas sealed therein, two spaced main electrodes, and an igniter electrode spaced from both main electrodes, means to continuously impress A.C. voltage across the main electrode of said tube, and means to cause said oscillating circuit to repeatedly pulse across the igniter electrode and one of said main electrodes of said tube while said oscillating circuit is closed by said manual means and D.C. voltage is being supplied by said D.C. voltage supply means, and said means to supply D.C. voltage including means to self-terminate the supply of D.C. voltage while the manual means is closed.

References Cited in the file of this patent

UNITED STATES PATENTS

| 2,178,423 | Inman | Oct. 31, 1939 |
| 2,186,013 | Edgerton | Jan. 9, 1940 |
| 2,606,308 | Parker | Aug. 5, 1952 |
| 2,722,631 | Bowtell | Nov. 1, 1955 |
| 2,935,650 | Rock | May 3, 1960 |